US012064860B2

(12) United States Patent
Mandel et al.

(10) Patent No.: US 12,064,860 B2
(45) Date of Patent: Aug. 20, 2024

(54) HAND-GUIDED WORK APPARATUS

(71) Applicant: Andreas Stihl AG & Co. KG, Waiblingen (DE)

(72) Inventors: Roland Mandel, Stuttgart (DE); Jonas Hefti, Stuttgart (DE); Jan Bejblik, Prague (CZ)

(73) Assignee: Andreas Stihl AG & Co. KG, Waiblingen (DE)

( * ) Notice: Subject to any disclaimer, the term of this patent is extended or adjusted under 35 U.S.C. 154(b) by 44 days.

(21) Appl. No.: 17/687,269

(22) Filed: Mar. 4, 2022

(65) Prior Publication Data
US 2022/0288765 A1  Sep. 15, 2022

(30) Foreign Application Priority Data
Mar. 15, 2021 (EP) .................................... 21162602

(51) Int. Cl.
| | |
|---|---|
| *B25F 5/02* | (2006.01) |
| *A01D 34/416* | (2006.01) |
| *A01D 34/82* | (2006.01) |
| *A01D 34/90* | (2006.01) |
| *A01D 101/00* | (2006.01) |

(52) U.S. Cl.
CPC ............. *B25F 5/02* (2013.01); *A01D 34/416* (2013.01); *A01D 34/824* (2013.01); *A01D 34/90* (2013.01); *A01D 2101/00* (2013.01)

(58) Field of Classification Search
CPC ....... B25F 5/02; A01D 34/416; A01D 34/824; A01D 34/90

USPC ......................................................... 173/170
See application file for complete search history.

(56) References Cited

U.S. PATENT DOCUMENTS

| 6,021,630 | A | * | 2/2000 | Higashi | ................. | A01D 34/90 |
|---|---|---|---|---|---|---|
| | | | | | | 30/276 |
| 11,141,828 | B2 | | 10/2021 | Kolb et al. | | |
| 2009/0229131 | A1 | * | 9/2009 | Tomiyama | ............. | A01D 34/90 |
| | | | | | | 30/276 |
| 2010/0313430 | A1 | * | 12/2010 | Yamaoka | ............. | A01D 34/828 |
| | | | | | | 30/276 |

(Continued)

FOREIGN PATENT DOCUMENTS

| CN | 112470737 A | 3/2021 |
|---|---|---|
| DE | 10 2014 006 910 A1 | 12/2014 |

(Continued)

*Primary Examiner* — Robert F Long
*Assistant Examiner* — Xavier A Madison
(74) *Attorney, Agent, or Firm* — Walter Ottesen, P.A.

(57) ABSTRACT

A hand-guided work apparatus has a handle having a first and a second operator-controlled element pivotably mounted thereon. The handle surrounds a guide tube. The first element can activate a motor. The guide tube defines a central plane containing a longitudinal axis. The plane is oriented parallel to a first axis of the first element. The first element projects out of the handle on a first side of the plane. The second element is pivotably mounted on a first and a second pivot bearing arranged on opposite sides of the plane. The tube projects through an opening in the second element. A third operator-controlled element can pivot about a third axis. In its actuated position, the third element holds the second element in its actuated position via a holder. The second axis of the second element lies in a plane extending perpendicular to a fourth axis of the holder.

18 Claims, 10 Drawing Sheets

(56) References Cited

U.S. PATENT DOCUMENTS

| | | |
|---|---|---|
| 2014/0174772 A1 | 6/2014 | Mandalka et al. |
| 2014/0352160 A1* | 12/2014 | Ifuku .................... A01D 34/90 |
| | | 30/276 |
| 2021/0001467 A1 | 1/2021 | Luecke et al. |
| 2021/0078123 A1 | 3/2021 | Oberhofer et al. |

FOREIGN PATENT DOCUMENTS

| | | |
|---|---|---|
| EP | 2 746 008 A1 | 6/2014 |
| EP | 2 875 904 A1 | 5/2015 |
| EP | 3 760 025 A1 | 1/2021 |

* cited by examiner

HAND-GUIDED WORK APPARATUS

CROSS REFERENCE TO RELATED APPLICATION

This application claims priority of European patent application no. 21 162 602.3, filed Mar. 15, 2021, the entire content of which is incorporated herein by reference.

BACKGROUND

US 2014/0352160 discloses a work apparatus which has a first operator-controlled element, namely a throttle, and a second operator-controlled element for actuating a safety blocking mechanism. The second operator-controlled element can rotate about an axis which is parallel to the longitudinal center axis of the guide tube and is arranged above the latter. The mounting is effected via an approximately semicircular guide element.

SUMMARY

It is an object of the disclosure to provide a hand-guided work apparatus which enables a simple and compact construction and can be operated ergonomically.

This object can, for example, be achieved by a hand-guided work apparatus having: a guide tube defining a longitudinal center axis; a tool unit having at least one tool; the tool unit being arranged on the guide tube; a drive motor configured to drive the at least one tool; a handle surrounding the guide tube arranged on the guide tube; a first operator-controlled element and a second operator-controlled element pivotably mounted on the handle; the first operator-controlled element being configured to activate the drive motor and being mounted so as to be pivotable about a first pivot axis, wherein the first pivot axis is transverse to the longitudinal center axis; the second operator-controlled element being mounted so as to be pivotable about a second pivot axis; the guide tube defining a central plane containing the longitudinal center axis, wherein the central plane is oriented parallel to the first pivot axis; the first operator-controlled element projecting out of the handle on a first side of the central plane; a first pivot bearing; a second pivot bearing; the second operator-controlled element being mounted pivotably on the first pivot bearing and the second pivot bearing; the first pivot bearing being arranged on the first side of the central plane; the second pivot bearing being arranged on a second side of the central plane opposite the first side; and, the second operator-controlled element defining an opening through which the guide tube projects.

It is provided that the second operator-controlled element is mounted pivotably on a first pivot bearing and a second pivot bearing. The two pivot bearings are arranged on opposite sides of a central plane. The central plane is oriented parallel to the first pivot axis of the first operator-controlled element and contains the longitudinal center axis of the guide tube. The operator-controlled element has an opening through which the guide tube projects. The operator-controlled element accordingly engages around the guide tube. With a simple and compact construction, an oblique position of the second pivot axis relative to the longitudinal center axis of the guide tube is consequently possible. Ergonomic operation is consequently enabled.

An advantageous construction results if the second operator-controlled element extends over an angle of at least 180°, preferably over an angle of at least 270°, about the longitudinal center axis of the guide tube. An angle of at least 270° is in particular advantageous when the second operator-controlled element has at least three operator-controlled sections at which an operator can actuate the second operator-controlled element. The second operator-controlled element particularly preferably extends over the whole circumference of the guide tube, that is, over 360° about the longitudinal center axis around the guide tube. A high degree of stability of the second operator-controlled element can consequently be achieved in a simple way.

Ergonomic operation can be achieved if, viewed parallel to the first pivot axis of the first operator-controlled element, the second pivot axis of the second operator-controlled element is inclined relative to the longitudinal center axis of the guide tube by an angle which is from 5° to 85°. The angle by which the second pivot axis is inclined relative to the longitudinal center axis of the guide tube, viewed parallel to the first pivot axis, is advantageously from 10° to 60°, in particular from 15° to 45°, particularly preferably from 20° to 30°.

The second operator-controlled element is preferably actuated by the operator's thumb. The second operator-controlled element is preferably operated while the operator's hand at least partially surrounds the handle, that is, also the guide tube. By virtue of the angle of inclination of the second pivot axis relative to the longitudinal center axis, the actuating movement of the second operator-controlled element can be approximated to the ergonomic movement of the thumb about the operator's thumb joint such that ergonomic actuation results.

The second pivot axis preferably intersects the longitudinal center axis of the guide tube. The second pivot axis and the longitudinal center axis of the guide tube advantageously are superimposed with each other congruently, viewed perpendicular to the central plane.

The second operator-controlled element is advantageously part of a blocking unit which prevents unintentional actuation of the first operator-controlled element. The second operator-controlled element advantageously blocks in an unactuated position movement of the first operator-controlled element in the direction of an actuated position of the first operator-controlled element. The second operator-controlled element advantageously mechanically blocks the first operator-controlled element. In particular, the second operator-controlled element directly blocks the first operator-controlled element. The second operator-controlled element preferably lies in an unactuated position in the pivoting path of the first operator-controlled element. If the second operator-controlled element is situated in its unactuated position, the first operator-controlled element cannot be actuated and the drive motor cannot be started up.

Because the first pivot bearing of the second operator-controlled element and the first operator-controlled element are arranged on the same side of the central plane, the blocking force which is exerted on the second operator-controlled element by the first operator-controlled element when the first operator-controlled element is actuated with the second operator-controlled element unactuated can be imparted directly to the first pivot bearing.

The handle advantageously has a transverse plane which extends perpendicular to the longitudinal center axis in a region of the handle which is situated remotely from the first operator-controlled element. The transverse plane preferably extends in a region in which a little finger of the operator is to be arranged. The first pivot bearing advantageously has a larger spacing from the transverse plane than the second pivot bearing. The first pivot axis advantageously has a spacing from the transverse plane which is smaller than the spacing of the first pivot bearing from the transverse plane. The second pivot bearing and the first pivot axis of the first operator-controlled element are advantageously arranged at approximately the same spacing from the transverse plane.

In order to enable ergonomic operation for both right-handed and left-handed people, it is provided that the second operator-controlled element can be pivoted out of the unactuated position in a first pivoting direction into a first release position, and in a second opposite pivoting direction into a second release position. As a result, the second operator-controlled element can be actuated ergonomically with both the thumb of the right hand and the thumb of the left hand. The second operator-controlled element here advantageously has a plurality of actuating sections such that the operator can take hold of an actuating section of the second operator-controlled element in every position of the work apparatus.

The second operator-controlled element is advantageously spring-mounted. The spring here advantageously pretensions the second operator-controlled element into the unactuated position. In an advantageous configuration, the spring is a torsion spring or leg spring which is supported with both legs both relative to the housing and relative to the second operator-controlled element. This is particularly advantageous if the second operator-controlled element can be pivoted in two opposite pivoting directions into a first and a second release position. By using a leg spring, pretensioning out of the two release positions can be effected via a single spring.

Both legs of the leg spring are advantageously supported on the same housing part of the housing. If the leg spring is supported with both legs on different housing parts, positional tolerances between the housing parts can occur which induce different actuating and restoring forces for the two pivoting directions. By virtue of the two legs being supported on the same housing part, positional tolerances between the supporting of the legs can be minimized.

A third operator-controlled element is advantageously mounted on the handle so that it can pivot about a third pivot axis. It can be provided that the third operator-controlled element is part of a blocking unit and that, in the unactuated state of the third operator-controlled element, the first operator-controlled element or the second operator-controlled element cannot be actuated.

In an embodiment, the third operator-controlled element serves to hold the second operator-controlled element in its release position. In this embodiment, the third operator-controlled element advantageously does not form part of a blocking unit. In order to actuate the first operator-controlled element and start up the drive motor, the third operator-controlled element advantageously does not need to be actuated. If the third operator-controlled element serves to hold the second operator-controlled element in its release position, the second operator-controlled element does not need to be held permanently in the actuated position by the user.

The third operator-controlled element is advantageously arranged on the second side of the central plane. The first operator-controlled element and the third operator-controlled element are preferably arranged on opposite sides of the central plane. As a result, the first operator-controlled element can be actuated with the index finger and the third operator-controlled element with the palm of an operator's hand. In this arrangement, the third operator-controlled element can be held permanently actuated by the operator with the exertion of a small amount of force.

The third pivot axis advantageously has a smaller spacing from the transverse plane than the first pivot axis. In particular, the third pivot axis has a smaller spacing from the transverse plane than the second pivot bearing.

The third pivot axis advantageously extends parallel to the first pivot axis. In a further embodiment, the third pivot axis extends through the second pivot bearing. It can, however, also be provided that the third pivot axis extends spaced apart from the second pivot bearing.

The work apparatus advantageously has means which hold the second operator-controlled element in its release position as long as the third operator-controlled element is situated in its actuated position. As a result, the second operator-controlled element advantageously only needs to be actuated to start up the drive motor and can then be held in its actuated position via the third operator-controlled element.

A simple configuration results if the work apparatus has a holding element on which the third operator-controlled element acts and which holds the second operator-controlled element in its release position as long as the third operator-controlled element is situated in its actuated position. Because the third operator-controlled element does not act directly on the second operator-controlled element but via a holding element, the movements of the third operator-controlled element and second operator-controlled element can be decoupled. The holding element can be arranged such that force is imparted favorably to the second operator-controlled element while the third operator-controlled element can be arranged such that it can be actuated and held ergonomically by the user.

In a further embodiment, the third operator-controlled element acts on the holding element via a spring. The spring makes it possible to actuate the third operator-controlled element while the second operator-controlled element has not yet been actuated. The holding element can be pretensioned via the spring such that the holding element passes into its holding position as soon as the second operator-controlled element is shifted into its release position. The spring makes it possible to actuate the second and the third operator-controlled element in any sequence. Simple, ergonomic operation is enabled as a result.

The holding element is particularly preferably mounted so that it can pivot about a fourth pivot axis. The fourth pivot axis extends in particular parallel to the third pivot axis. As a result, a favorable force profile and a favorable imparting of force to the housing of the work apparatus can be achieved. Bearing forces at the holding element can be reduced. A different arrangement of the fourth pivot axis can also be advantageous. It can also be provided that the holding element itself is formed as a spring.

A further object of the disclosure is to provide a hand-guided work apparatus which has an advantageous construction. For this purpose, it is provided that the second operator-controlled element is mounted so that it can pivot about a second pivot axis and the holding element is mounted so that it can pivot about a fourth pivot axis, and that the second pivot axis lies in a plane which extends perpendicular to the fourth pivot axis.

The arrangement of the fourth pivot axis in a plane which extends perpendicular to the fourth pivot axis is an inventive concept which is independent of the arrangement of the pivot bearing of the second operator-controlled element. The arrangement of the fourth pivot axis in a plane which extends perpendicular to the fourth pivot axis is also advantageous for work apparatuses in which the second operator-controlled element is not mounted with two pivot bearings which are arranged on opposite sides of a central plane and/or for work apparatuses with a second operator-controlled element which does not have an opening through which the guide tube projects.

The second pivot axis of the second operator-controlled element and the fourth pivot axis of the holding element accordingly do not extend parallel to each other. The second pivot axis advantageously extends in a plane which contains the longitudinal center axis of the guide tube. Particularly preferably, the second pivot axis and the fourth pivot axis are situated at an angle of 90° to each other, viewed in the direction of the longitudinal center axis. The second pivot axis and the fourth pivot axis can intersect, in particular at an angle of 90°, or extend spaced apart from each other. The fourth pivot axis preferably extends parallel to the first pivot axis of the first operator-controlled element and to the third pivot axis of the third operator-controlled element. Because the second pivot axis and the fourth pivot axis do not extend parallel to each other, the forces imparted by the second operator-controlled element to the holding element can be imparted readily to the housing of the work apparatus and act only partially in the actuating direction of the holding element.

BRIEF DESCRIPTION OF THE DRAWINGS

The invention will now be described with reference to the drawings wherein.

DESCRIPTION OF THE PREFERRED EMBODIMENTS

Figure 1:
FIG. 1 shows a schematic view of an operator with a hand-guided work apparatus.

FIG. 1 shows schematically a hand-guided work apparatus 1 which is being held by an operator. The work apparatus 1 has a guide tube 2 which carries a tool unit 3 at its free end. In the embodiment, the work apparatus 1 is a brushcutter. The work apparatus 1 can, however, also be a different hand-guided work apparatus, in particular a work apparatus with a guide tube such as, for example, a pole pruner, a hedge trimmer on a long shaft, or the like. The tool unit 3 includes a tool 23, strimming wire in the embodiment. The tool unit 3 can moreover include a gearbox and/or a drive motor. In the embodiment, a schematically illustrated drive motor 4 is arranged on that end of the guide tube 2 which is remote from the tool unit 3. A different arrangement of the drive motor 4, for example on the tool unit 3, can also be advantageous.

In the embodiment, a handle 5 and a bale handle 6 are arranged on the guide tube 2. A different further handle can be provided instead of the bale handle 6. The handle 5 surrounds the guide tube 2. The guide tube 2 has a longitudinal center axis 7.

Figure 2:
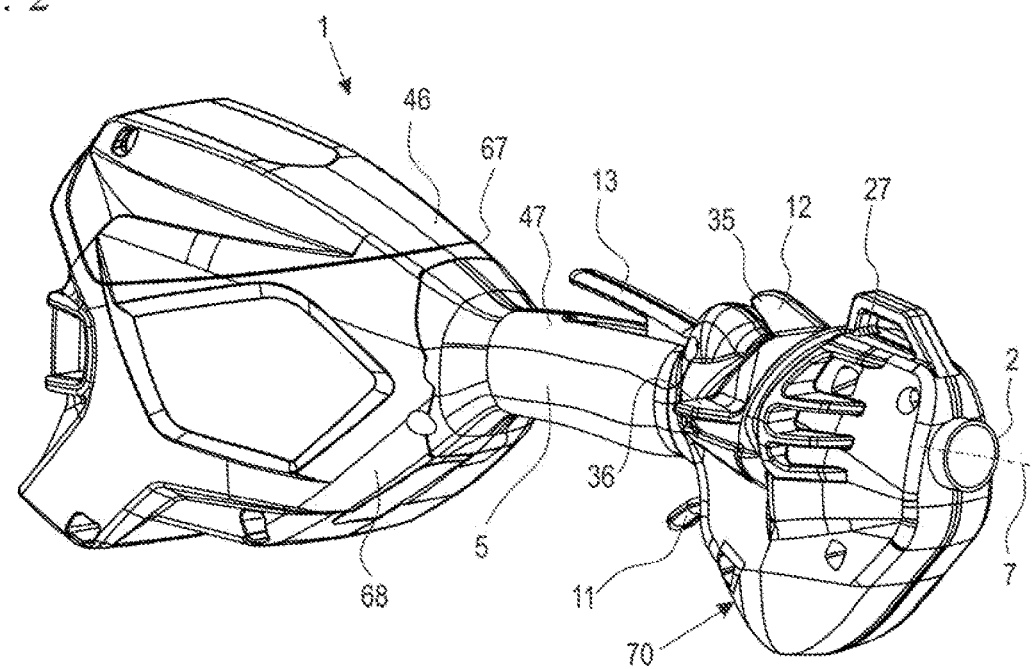
FIG. 2 shows a perspective view of the region of a housing of a work apparatus with a handle.

FIG. 2 shows an embodiment of a battery-operated work apparatus 1, namely a brushcutter. The guide tube 2 is illustrated as being cut off in FIG. 2. The handle 5 is part of a housing 46. The drive motor 4 can be arranged in the housing 46, for example as illustrated schematically in FIG. 1. In the embodiment according to FIG. 2, the housing 46 is configured to accommodate a rechargeable or disposable battery.

In the embodiment, the handle 5 is formed integrally with the housing 46. In the embodiment, the housing 46 is constructed from two housing half-shells 67 and 68 which are divided parallel to the longitudinal center axis 7 of the guide tube 2. The handle 5 forms a handle section 47 which the operator can grip with their hand. The guide tube 2 passes through the handle section 47. The handle 5 can preferably also be formed separately from the housing 46.

Figure 6:
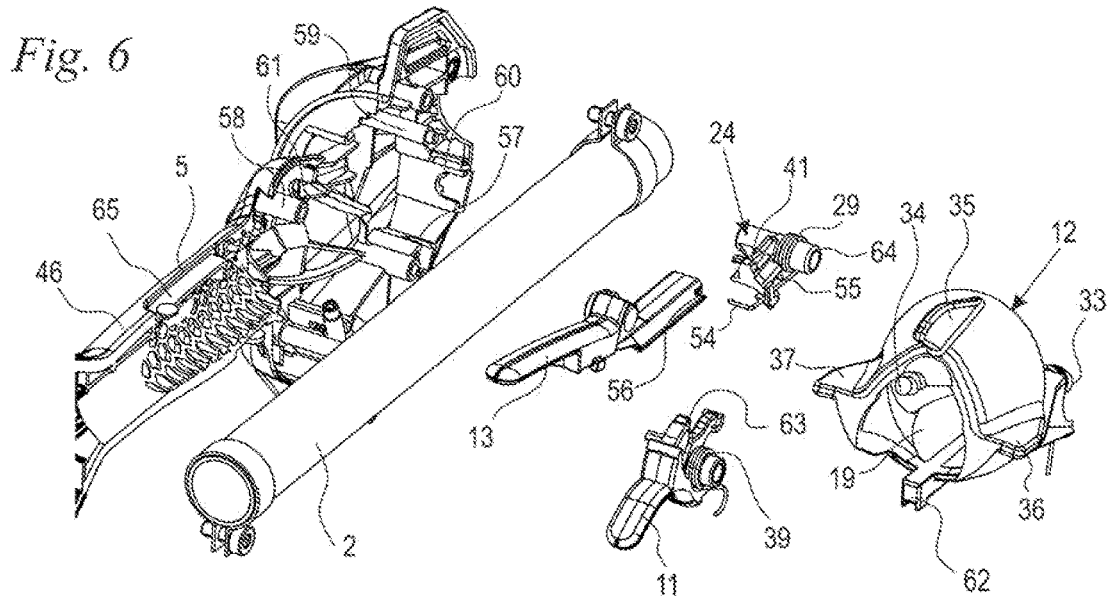
FIG. 6 shows an exploded view of the arrangement from FIG. 3.

A first operator-controlled element 11, a second operator-controlled element 12, and a third operator-controlled element 13 are arranged on the handle 5 such that they can be gripped by the operator. The first operator-controlled element 11 and the second operator-controlled element 12 are arranged adjacent to the handle section 47. In the embodiment, the third operator-controlled element 13 is raised from the handle section 47. The second operator-controlled element 12 has a plurality of operator-controlled sections, a first operator-controlled section 35 and a second operator-controlled section 36 of which are shown in FIG. 2. A third operator-controlled section 37 is illustrated in FIG. 6. A lifting eyelet 27 in which a lifting strap can be suspended, is arranged adjacent to the second operator-controlled element 12 on the housing 46.

The housing 46 forms a handle housing 70 on which the handle 5 is formed and in which the operator-controlled elements 11, 12, and 13 are mounted.

Figure 3:
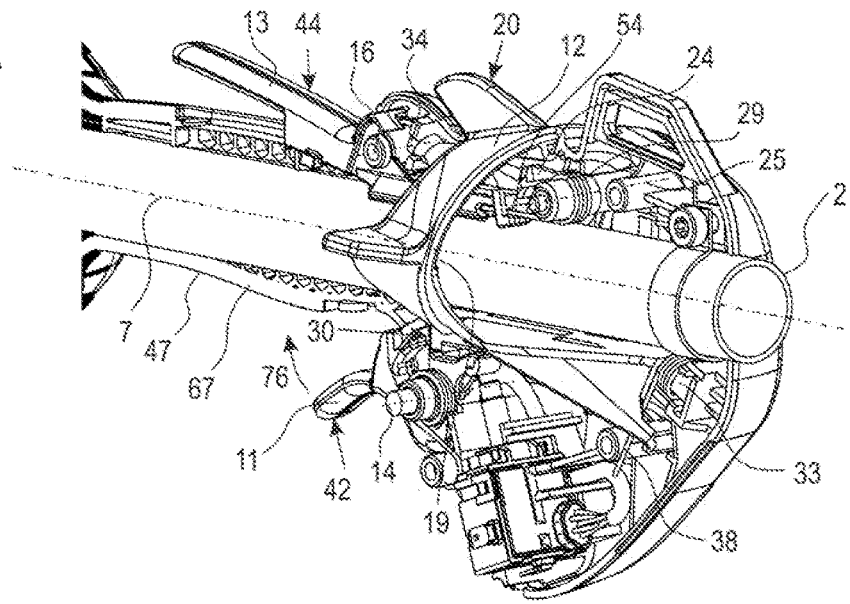
FIG. 3 shows a perspective view of the handle, a front housing half-shell being removed so that the internal elements are visible.

The second housing half-shell 68 is not illustrated in FIG. 3 such that the guide tube 2 which passes through the handle section 47 can be seen. As shown in FIG. 3, the first operator-controlled element 11 is mounted so that it can pivot about a first pivot axis 14. The third operator-controlled element 13 is mounted so that it can pivot about a third pivot axis 16. The third pivot axis 16 is advantageously parallel to the first pivot axis 14.

The third operator-controlled element 13 is coupled to a holding element 24. The third operator-controlled element 13 is advantageously coupled to the holding element 24 via a spring 29. In the embodiment, the holding element 24 is configured as a pivotable lever. The holding element 24 is mounted so that it can pivot about a fourth pivot axis 25. In the embodiment, the fourth pivot axis 25 extends parallel to the third pivot axis 16. The fourth pivot axis 25 advantageously extends parallel to the first pivot axis 14.

In the embodiment, the second operator-controlled element 12 engages around the guide tube 2. The second operator-controlled element 12 can advantageously be returned into an unactuated position 20 by a spring 38. The second operator-controlled element 12 is pretensioned by the spring 38 in the direction of its unactuated position 20 illustrated in FIGS. 3 to 5. In the embodiment, the spring 38 is a torsion spring, the two legs 81 and 82 (FIG. 7) of which are supported on the second operator-controlled element 12 and on the housing 46. As shown in FIG. 6, the handle housing 70 has a cutout 57 for the spring 38.

Figure 4:
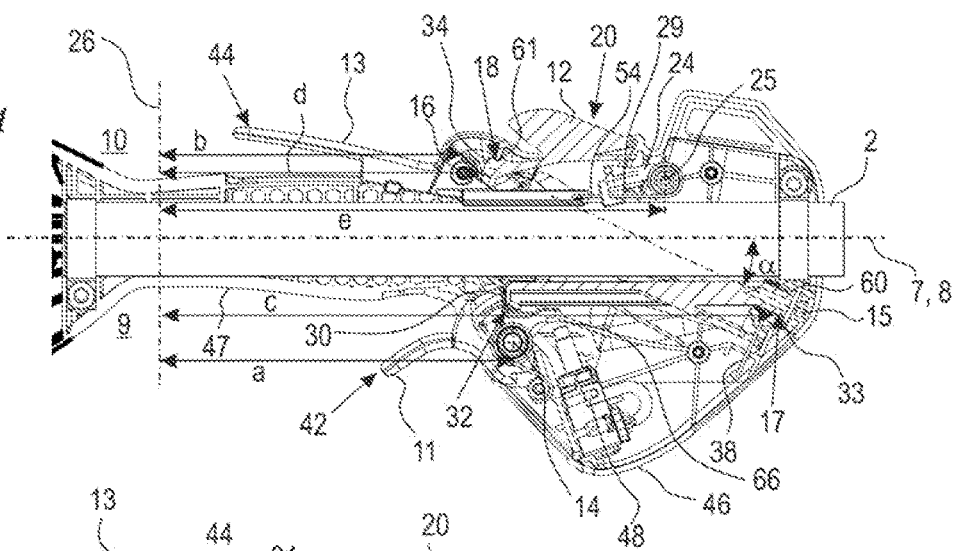
FIG. 4 shows a longitudinal section through the handle.
Figure 5:
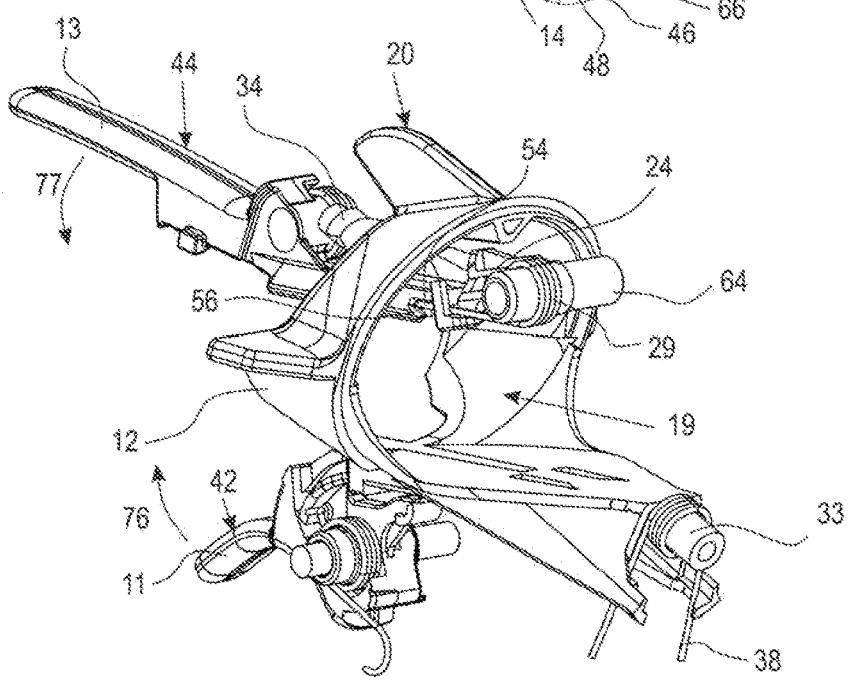
FIG. 5 shows a perspective view of the operator-controlled elements and the holding element of the handle.

The second operator-controlled element 12 has a first bearing lug 33 and a second bearing lug 34 for mounting it. As shown in FIG. 4, the first bearing lug 33 projects into a receptacle 60 of the handle housing 70 and forms a first pivot bearing 17 with it. The second bearing lug 34 is mounted in a receptacle 61 of the handle housing 70 and forms a second pivot bearing 18 with it. A different configuration of the pivot bearing 17 and 18 can also be advantageous. In particular, bearing lugs 33 and 34 can be formed on the handle housing 70 and engage in receptacles 60, 61 of the second operator-controlled element 12. The second operator-controlled element 12 is mounted so that it can pivot about a second pivot axis 15 at the two pivot bearings 17 and 18. The second pivot axis 15 extends inclined by an angle α with respect to the longitudinal center axis 7 of the guide tube 2, viewed in the direction of the first pivot axis 14. The second pivot axis 15 accordingly does not extend parallel to the longitudinal center axis 7. The angle α is advantageously from 5° to 85°, in particular from 10° to 60°, preferably from 15° to 45°, particularly preferably from 20° to 30°. In the embodiment, an angle α of approximately 25° is provided. An ergonomic direction of movement of the second operator-controlled element 12 is consequently possible during the actuation. As shown in FIGS. 3 and 5, the second operator-controlled element 12 has an opening 19 through which the guide tube 2 projects. The second operator-controlled element 12 surrounds the guide tube 2 over its whole circumference in the embodiment. The second operator-controlled element 12 accordingly extends over an angle of 360° about the longitudinal center axis 7. The second operator-controlled element 12 preferably surrounds the guide tube 2 over at least 180°, in particular at least 270°, of the circumference of the guide tube 2. The second operator-controlled element 12 advantageously extends over an angle of at least 180°, in particular at least 270°, about the longitudinal center axis 7 of the guide tube 2. The second operator-controlled element 12 here advantageously extends around the guide tube 2 over the angular range.

As shown in FIG. 4, the second pivot axis 15 intersects the longitudinal center axis 7 in the embodiment. The longitudinal center axis 7 lies in a central plane 8. The central plane 8 extends parallel to the first pivot axis 14 of the first operator-controlled element 11. The first pivot bearing 17 is arranged on a first side 9 of the central plane 8. In the embodiment, the first pivot bearing 17 and the first operator-controlled element 11 are situated on the same side 9 of the central plane 8. The second pivot bearing 18 is arranged on the opposite second side 10 of the central plane 8. In the embodiment, the third operator-controlled element 13 and the holding element 24 are also arranged on the second side 10 of the central plane 8. The holding element 24 can engage in the second operator-controlled element 12 on the first side 9 or on the second side 10 of the central plane 8. The holding element 24 preferably engages in the second operator-controlled element 12 on the second side 10 of the central plane 8.

In the working position in which the work apparatus 1 is usually held, the first side 9 advantageously lies below the central plane 8 and the second side 10 advantageously above the central plane 8. In the working position in which the work apparatus 1 is usually held, the first operator-controlled element 11 is preferably arranged below the guide tube 2 and the third operator-controlled element 13 above the guide tube 2. The second operator-controlled element 12 projects from the handle housing 70 on the second side 10 of the central plane 8.

The handle 5 has a transverse plane 26 which extends perpendicular to the longitudinal center axis 7 of the guide tube 2. The transverse plane 26 advantageously intersects the handle section 47 in a region in which a user's little finger is arranged when the work apparatus is being held in the usual way. The first pivot axis 14 of the first operator-controlled element 11, both pivot bearings 33 and 34 of the second operator-controlled element 12, and the third pivot axis 16 of the third operator-controlled element 13 are arranged on the same side of the transverse plane 26. The fourth pivot axis 25 of the holding element 24 is also arranged on the same side of the transverse plane 26 as the pivot axes 14 and 16 of the operator-controlled elements 11 and 13 and the pivot bearings 33 and 34 of the second operator-controlled element 12.

As shown in FIG. 4, the first pivot axis 14 of the first operator-controlled element 11 has a spacing a from the transverse plane 26. The third pivot axis 16 of the third operator-controlled element 13 has a spacing b from the transverse plane 26. The first pivot bearing 33 of the second operator-controlled element 12 has a spacing c from the transverse plane 26. The second pivot bearing 34 of the second operator-controlled element 12 has a spacing d from the transverse plane 26. The fourth pivot axis 25 of the holding element 24 has a spacing e from the transverse plane 26.

The spacing d of the second pivot bearing 34 from the transverse plane 26 is greater than the spacing c of the first pivot bearing 33 from the transverse plane 26. The first pivot bearing 33 is accordingly further away from the transverse plane 26 than the second pivot bearing 34. The second pivot axis 15 is inclined forward and downward relative to a user's hand on the handle section 47.

The spacing a of the first pivot axis 14 of the first operator-controlled element 11 from the transverse plane 26 is smaller than the spacing c of the first pivot bearing 33 of the second operator-controlled element 12 from the transverse plane 26. The spacing a of the first pivot axis 14 of the first operator-controlled element 11 from the transverse plane 26 corresponds approximately to the spacing d of the second pivot bearing 34 of the second operator-controlled element 12 from the transverse plane 26.

The spacing b of the third pivot axis 16 of the third operator-controlled element 13 is smaller than the spacing d of the second pivot bearing 34 of the second operator-controlled element 12 from the transverse plane 26. The spacing e of the fourth pivot axis 25 of the holding element 24 is greater than the spacing d of the second pivot bearing 34 of the second operator-controlled element 12 from the transverse plane 26. The spacing e of the fourth pivot axis 25 of the holding element 24 is greater than the spacing b of the third pivot axis 16 of the third operator-controlled element 13 from the transverse plane 26.

The blocking unit 30 and the first pivot bearing 33 of the second operator-controlled element 12 are arranged approximately on a line which extends parallel to the longitudinal center axis 7 of the guide tube 2. Because the blocking unit 30 and the first pivot bearing 33 are arranged on the same side of the central plane 8 and in particular also approximately with the same spacing from the central plane 8, a force exerted on the blocking unit 30 by the user in the blocking position 32 with the first operator-controlled element 11 can be imparted as a compressive force directly to the handle housing 70 via the first pivot bearing 33.

Figure 16:
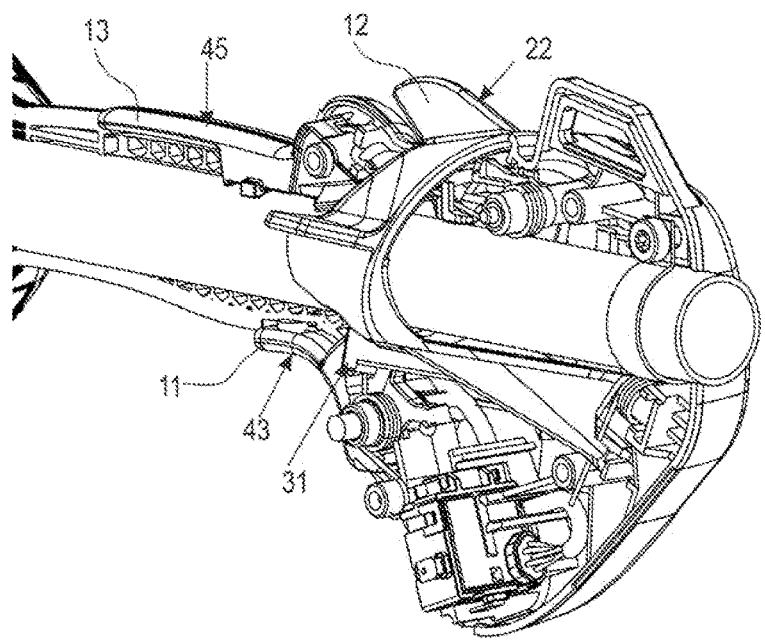
FIGS. 16 to 18 show views according to FIG. 3 to FIG. 5, the first, the second, and the third operator-controlled elements being actuated.
Figure 17:
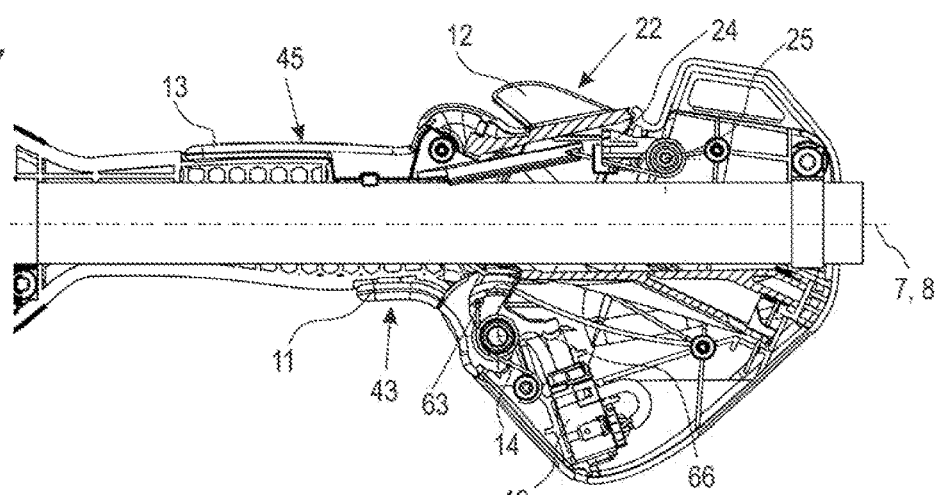
Figure 18:
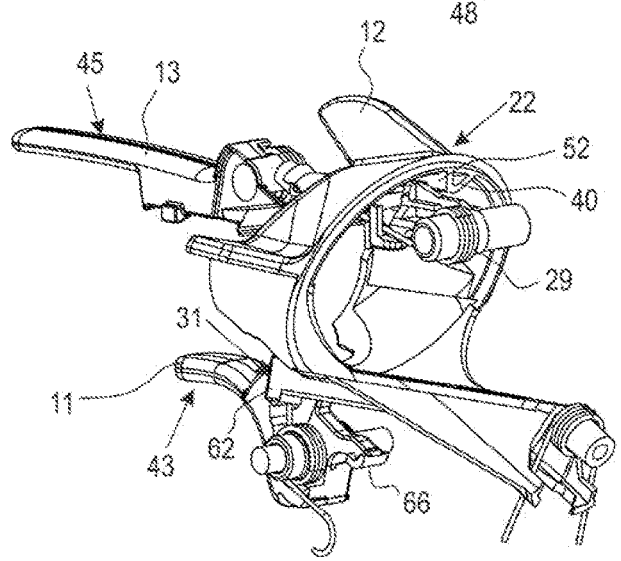

A switch 48 is provided for starting up the drive motor 4. In the embodiment, the switch 48 is arranged on the first side 9 of the central plane 8. The first operator-controlled element 11 has an actuating section 66 which actuates the switch 48 in the actuated position of the first operator-controlled element 11. This is illustrated in FIGS. 16 to 18. The signal generated at the switch 48 serves to activate the drive motor 4. The switch 48 is advantageously a potentiometer.

FIGS. 3 to 5 show the first operator-controlled element 11 in its unactuated position 42. The second operator-controlled element 12 is arranged in its unactuated position 20 and the third operator-controlled element 13 in its unactuated position 44. The second operator-controlled element 12 forms a blocking unit 30 for the first operator-controlled element 11. In the unactuated position 20, illustrated in FIGS. 3 to 5, of the second operator-controlled element 12, the blocking unit 30 is situated in its blocking position 32. The second operator-controlled element 12 is situated in the pivoting path of the first operator-controlled element 11. When it moves in the direction of its actuated position, the first operator-controlled element 11 abuts the second operator-controlled element 12 and can consequently not be shifted in the direction of an arrow 76 (FIGS. 3 and 5) into its actuated position, as will be further explained with regard to FIG. 6.

Figure 10:
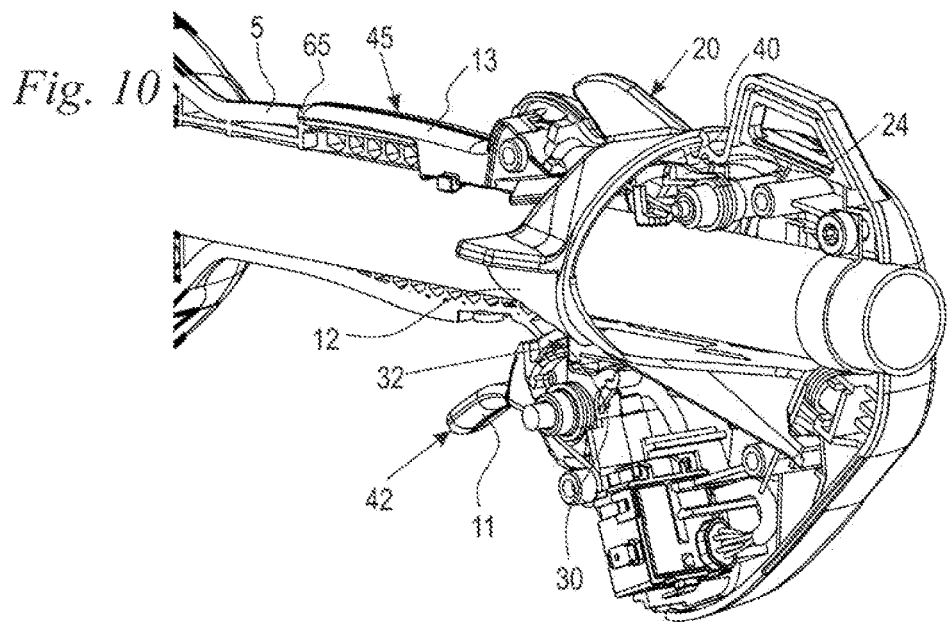
FIGS. 10 to 12 show views according to FIG. 3 to FIG. 5, the third operator-controlled element being actuated.
Figure 11:
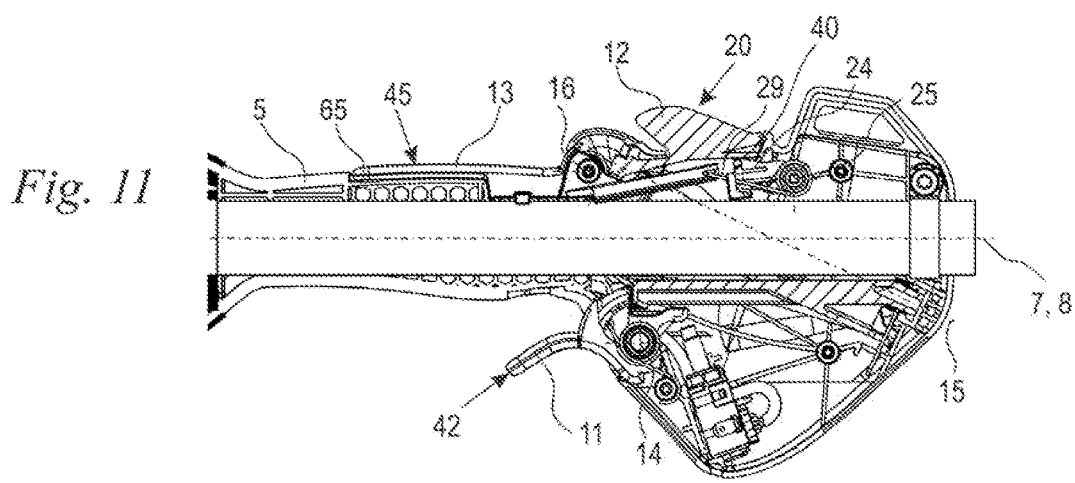
Figure 12:
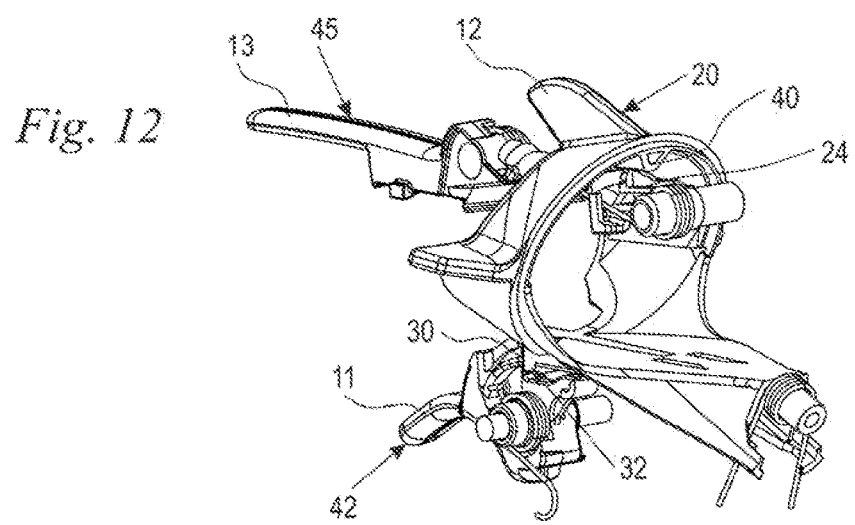

As shown in FIGS. 3 to 5, the third operator-controlled element 13 preferably acts on the holding element 24 via the spring 29. The third operator-controlled element 13 can be actuated by the user in the direction of an arrow 77 which is shown in FIG. 5. The spring 29 bears with a first end 54 against a receptacle 56 of the third operator-controlled element 13. If the second operator-controlled element 12 is situated in its unactuated position 20, the third operator-controlled element 13 can nevertheless be actuated. The actuated position 45 of the third operator-controlled element 13 is shown in FIGS. 10 to 12. The actuation of the third operator-controlled element 13 when the second operator-controlled element 12 is in the unactuated position 20 causes the holding element 24 to be pivoted until it contacts the second operator-controlled element 12. A further actuating movement of the third operator-controlled element 13 causes elastic deformation of the spring 29 because the holding element 24 can no longer move.

The exploded view in FIG. 6 shows in detail the configuration of the operator-controlled elements 11 to 13 and their mounting in the handle housing 70. A bearing lug 58 is provided on the handle housing 70 for pivotably mounting the third operator-controlled element 13. As also shown in FIG. 6, the spring 29 has a second end 55 which is supported on the holding element 24. The holding element 24 moreover has a holding section 41 which is provided for contacting the second operator-controlled element 12. Three operator-controlled sections 35, 36, and 37 of the second operator-controlled element 12 and the opening 19 for the guide tube 2 can also be seen in FIG. 6. The two operator-controlled sections 36 and 37 are arranged approximately opposite each other. The first operator-controlled section 35 is arranged on the circumference between the second operator-controlled section 36 and the third operator-controlled section 37. The operator-controlled sections 35 to 37 are preferably directed approximately radially outward and can, for example, enclose an angle of approximately 90°. A different number and/or arrangement of operator-controlled sections 35, 36, and 37 can also be advantageous. In particular, a second operator-controlled element 12 with two operator-controlled sections forms an advantageous alternative embodiment.

As also shown in FIG. 6, the second operator-controlled element 12 has a blocking section 62 which forms a part of the blocking unit 30. A blocking region 63, which comes into contact with the blocking section 62 when the second operator-controlled element 12 is unactuated and hence prevents the first operator-controlled element 11 from being shifted into its actuated position 43, is formed on the first operator-controlled element 11. The first operator-controlled element 11 is preferably pretensioned by a spring 39 in the direction of its unactuated position 42.

The receptacles 60 and 61 on the handle housing 70 for the bearing lugs 33 and 34 of the second operator-controlled element 12 can also be seen in FIG. 6. The handle housing 70 moreover has a bearing lug 59 for the holding element 24. The holding section 41 extends from a bearing section 64 of the holding element 24 which is to be arranged on the bearing lug 59 in the direction of the third operator-controlled element 13.

When the third operator-controlled element 13 is actuated, the third operator-controlled element 13 deflects the first end 54 of the spring 29 approximately radially outward relative to the guide tube 2. The holding section 41 is consequently also pretensioned radially outward. The second operator-controlled element 12 surrounds the holding element 24 at its outer circumference such that the holding element 24 is pressed against the second operator-controlled element 12. It can also be provided that the holding element 24 interacts with the operator-controlled element 12 at a different location.

Figure 7:
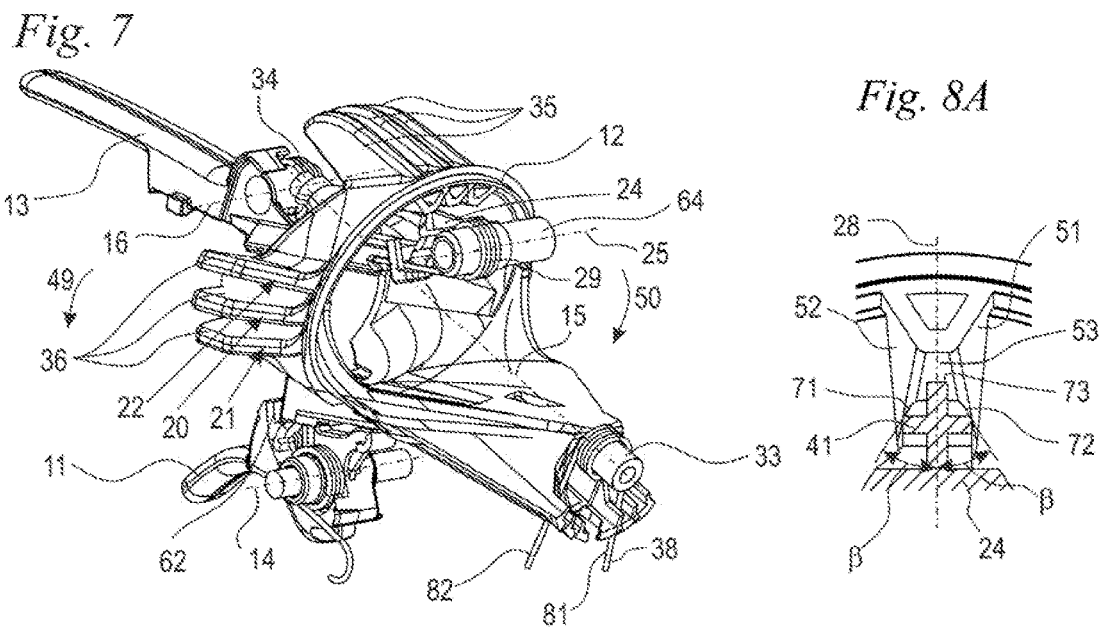
FIG. 7 shows a view of the arrangement from FIG. 5, the second operator-controlled element being illustrated in its unactuated position and its two actuated positions.

As is shown schematically in FIG. 7, the second operator-controlled element 12 can be pivoted out of its central unactuated position in a first pivoting direction 49 into a first actuated position 21 and in a second opposite pivoting direction 50 into a second actuated position 22. All three positions of the second operator-controlled element 12 are indicated in a view in FIG. 7. The actuated positions 21 and 22 are so-called release positions in which the first operator-controlled element 11 is not blocked by the second operator-controlled element 12. In the actuated positions 21 and 22, the blocking section 62 is not situated in the pivoting range of the blocking region 63. The pivoting directions 49 and 50 are also indicated in FIG. 8.

Figure 8A:
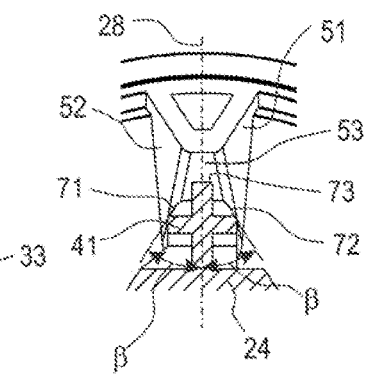
FIG. 8A shows a view of an enlarged detail of FIG. 8.
Figure 8:
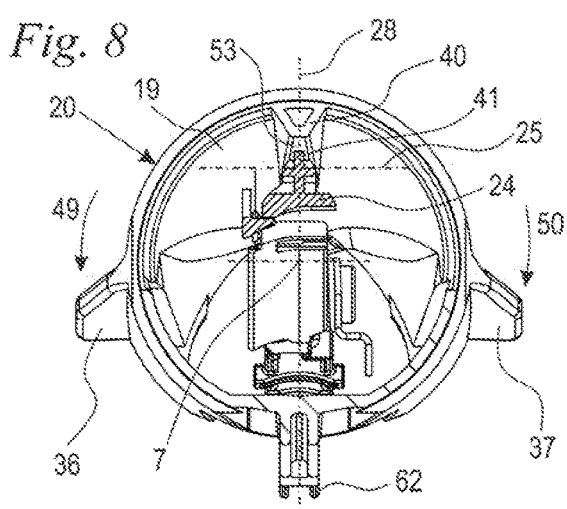
FIG. 8 shows a view in section through the arrangement from FIG. 7 in the unactuated position of the second operator-controlled element.

FIG. 8 shows the second operator-controlled element 12 and the holding element 24 in the unactuated position 20 of the second operator-controlled element 12. As shown in FIG. 8, the holding element 24 projects into the opening 19 of the second operator-controlled element 12. The second operator-controlled element 12 advantageously has an inwardly projecting projection 40. The holding section 41 of the holding element 24 is arranged opposite the projection 40 and can contact an end face 53 of the projection 40 in particular when the third operator-controlled element 13 is actuated. The second pivot axis 15 lies in a plane 28. The plane 28 extends perpendicular to the fourth pivot axis 25. In the embodiment, the plane 28 contains the longitudinal center axis 7 of the guide tube 2 and contains the second pivot axis 15 of the second operator-controlled element 12. It can also be provided that the plane 28 extends parallel to the longitudinal center axis 7 and spaced apart from the longitudinal center axis 7. As shown in FIGS. 7 and 8, the fourth pivot axis 25 and the second pivot axis 15 do not extend parallel to each other.

As shown in FIG. 8A, on its holding section 41 the holding element 24 has an end face 73 which is configured to contact the end face 53 of the projection 40. The projection 40 moreover has contact surfaces 51 and 52 which are inclined relative to the plane 28. The holding element 24 has a first contact surface 71 which can come into contact with the first contact surface 51 on the projection 40 in the first actuated position 21 of the second operator-controlled element 12. On the opposite side, the holding element 24 has a second contact surface 72 which can come into contact with the second contact surface 52 in the second actuated position 22. The contact surfaces 71 and 72 in each case enclose an angle β with the central plane 28 which narrows toward the end face 73. The angle β is chosen such that no self-locking can occur between the holding element 24 and the second operator-controlled element 12. The angle β is advantageously 5° to 40°, in particular 20° to 30°. An angle β of approximately 25° is considered to be particularly advantageous.

Figure 9:
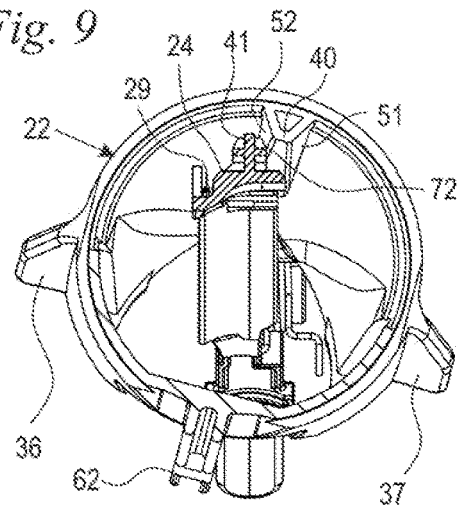
FIG. 9 shows a view in section according to FIG. 8 with the second operator-controlled element in an actuated position.

FIG. 9 shows the arrangement when the second operator-controlled element 12 is actuated. The second operator-controlled element 12 is situated in its second actuated position 22. The contact surfaces 52 and 72 contact each other. The contact surface 72 of the holding element 24 is situated in the pivoting path of the projection 40 in the direction of the unactuated position 20 of the second operator-controlled element 12. The second operator-controlled element 12 can consequently not pivot back into its unactuated position 20 and instead is held in the actuated position 22 by the holding element 24.

Because of the inclined position of the contact surface 72, the force exerted by the second operator-controlled element 12 in the direction of its unactuated position 20 is broken down into a relatively large force component which acts parallel to the fourth pivot axis 25 and a considerably smaller force component which acts in the direction of the longitudinal center axis 7. By virtue of the angle (FIG. 8A), the radially inwardly acting force component on the holding element 24 is small and the holding element 24 can itself be held in its position by a relatively weak spring 29. The forces exerted by the second operator-controlled element 12 can be readily diverted into the handle housing 70 via the bearing section 64 (FIGS. 6 and 7) such that a stable configuration results. It is advantageous if the projection 40 into which the holding element 24 engages is arranged as far away as possible radially from the second pivot axis 15.

The blocking section 62 of the blocking unit 30 can also be seen in FIGS. 8 and 9.

In FIGS. 10 to 12, the first operator-controlled element 11 is situated in its unactuated position 42 and the second operator-controlled element 12 is situated in its unactuated position 20. The third operator-controlled element 13 has been pivoted relative to the unactuated position 44 illustrated in FIGS. 3 to 5 and is now situated in its actuated position 45. In this position, the third operator-controlled element 13 contacts the outer circumference of the handle 5. In the embodiment, a recess 65 in which the third operator-controlled element 13 lies is provided on the handle 5 such that a comfortable outer contour of the handle 5 results. The recess 65 is also illustrated in FIG. 6. Because of the pivoting of the third operator-controlled element 13, the spring 29 has been pretensioned. The holding element 24 contacts the projection 40 of the second operator-controlled element 12.

Figure 13:
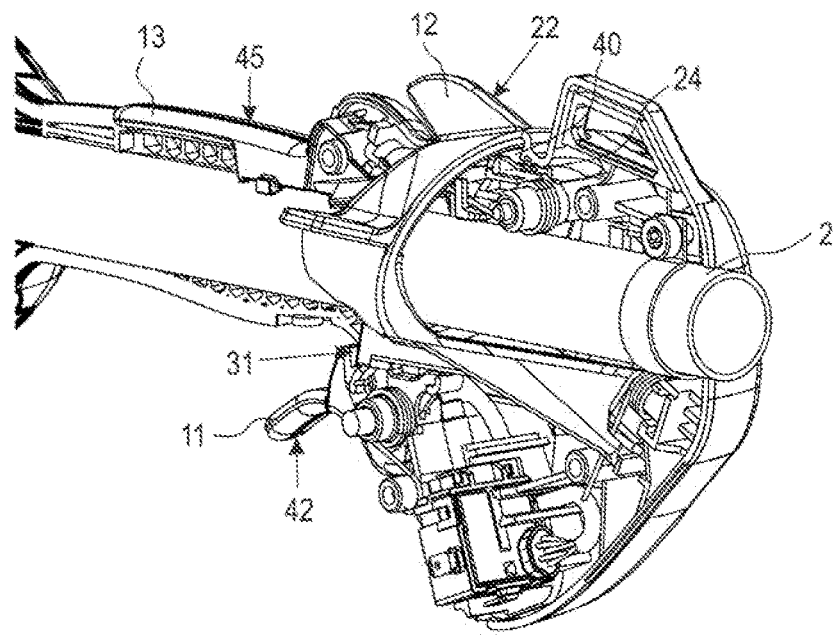
FIGS. 13 to 15 show views according to FIG. 3 to FIG. 5, the second and the third operator-controlled elements being actuated.
Figure 14:
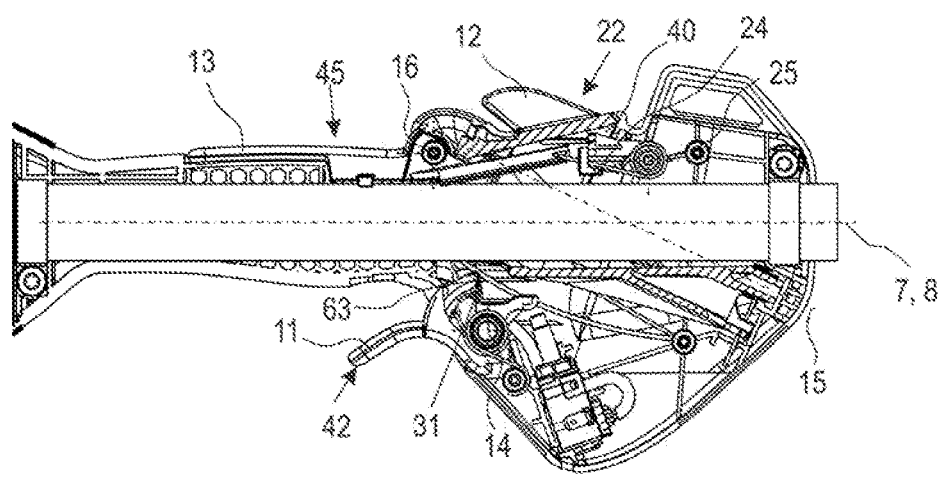
Figure 15:
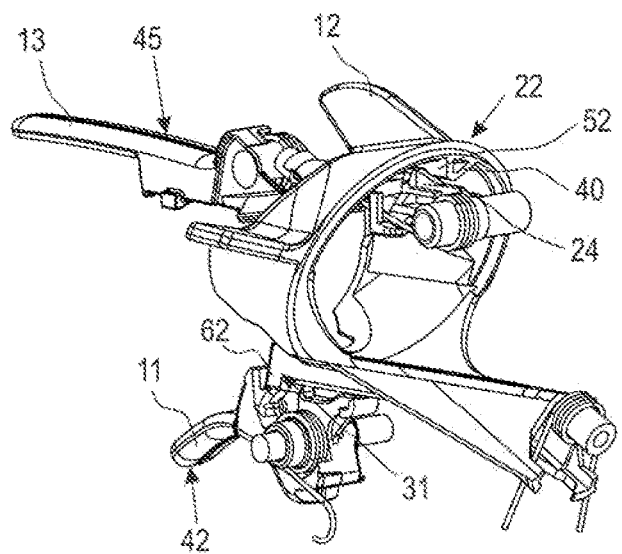

FIGS. 13 to 15 show the arrangement after the second operator-controlled element 12 has been pivoted into its second actuated position 22. A corresponding arrangement results when the second operator-controlled element 12 is pivoted into its first actuated position 21. The projection 40 has moved in a circumferential direction relative to the longitudinal center axis 7 such that the holding element 24 could pivot radially outward. As shown in FIG. 9 and FIG. 15, the holding element 24 contacts the second contact surface 52 of the projection 40. As a result, the second operator-controlled element 12 cannot pivot back into its unactuated position 20 (FIGS. 10 to 12).

The operator can first actuate the third operator-controlled element 13 and then the second operator-controlled element 12. Alternatively, the operator can also first actuate the second operator-controlled element 12 and then the third operator-controlled element 13. The operating sequence can be freely chosen by the operator by virtue of the spring 29. After both operator-controlled elements 12, 13 have been situated in their actuated position 45 and 21 or 22, the operator can let go of the second operator-controlled element 12. The second operator-controlled element 12 is held in the actuated position 21 or 22 by the third operator-controlled element 13 via the spring 29 and the holding element 24.

In FIGS. 16 to 18, the first operator-controlled element 11 is also situated in its actuated position 43. When the second operator-controlled element 12 pivots into its second actuated position 22, the blocking section 62 (FIG. 15) has been pivoted out of the pivoting range of the blocking region 63 of the first operator-controlled element 11. This can be seen in FIGS. 16 to 18. The blocking section 62 correspondingly pivots in the opposite direction out of the blocking region 63 of the first operator-controlled element 11 when the second operator-controlled element is pivoted into its first actuated position 21. The blocking unit 30 is situated in its release position 31. The first operator-controlled element 11 actuates a switch 48 and thus starts up the drive motor 4 (FIG. 1). In the embodiment, the first operator-controlled element 11 has an actuating section 66 which acts on the switch 48.

The blocking region 63 of the first operator-controlled element 11 lies in the pivoting range of the blocking section 62 of the second operator-controlled element 12. The second operator-controlled element 12 can consequently not pivot back into its unactuated position 20 as long as the first operator-controlled element 11 is actuated. The second operator-controlled element 12 is moreover held in its actuated position 22, 21 via the holding element 24 which contacts the projection 40 with one of its contact surfaces 71, 72. As soon as the operator lets go of the third operator-controlled element 13 and the first operator-controlled element 11, the holding element 24 pivots back into its starting position by virtue of the force of the spring 29.

Figure 19:
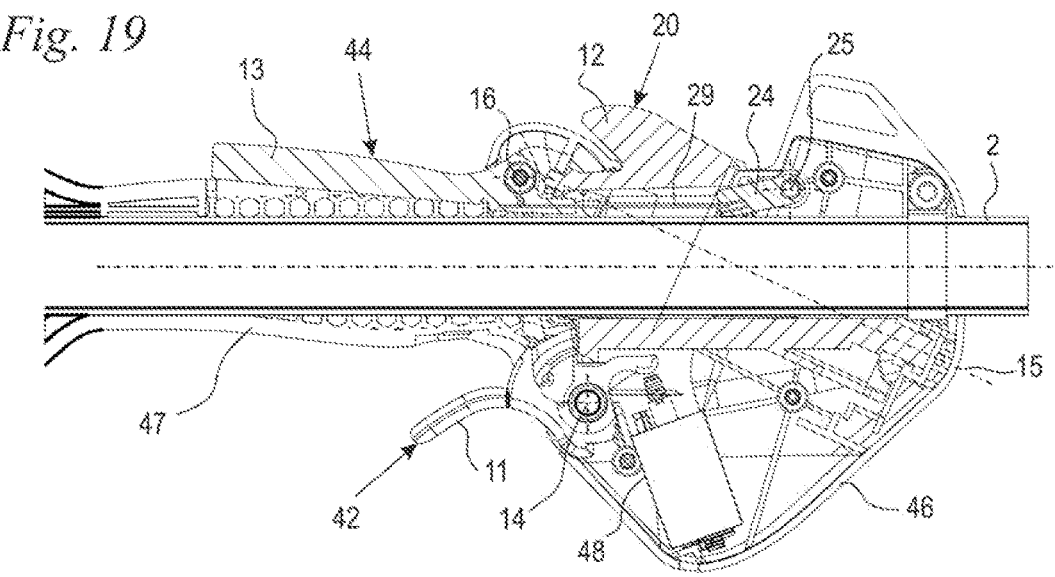
FIG. 19 shows a view in section of an alternative embodiment of the handle of the work apparatus with unactuated operator-controlled elements.
Figure 20:
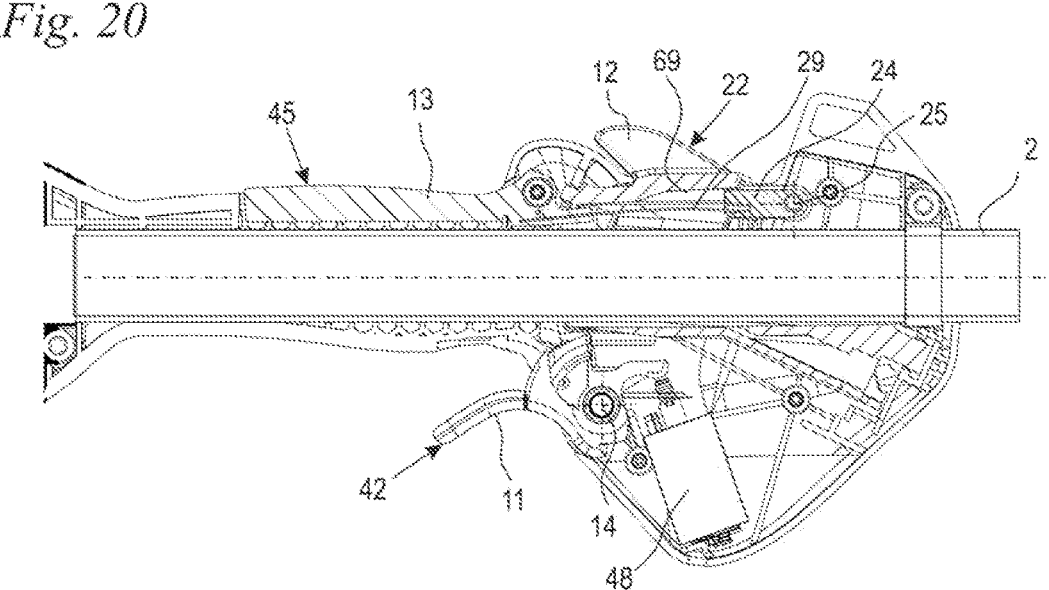
FIG. 20 shows a view in section of the handle from FIG. 19, the second and the third operator-controlled elements being actuated.

FIGS. 19 and 20 show an alternative embodiment in which the third operator-controlled element 13 acts on the holding element 24 via a spring 29 in the form of a leaf spring. In the embodiment according to FIGS. 19 and 20, the second operator-controlled element 12 has a recess 69 for the holding element 24.

Figure 21:
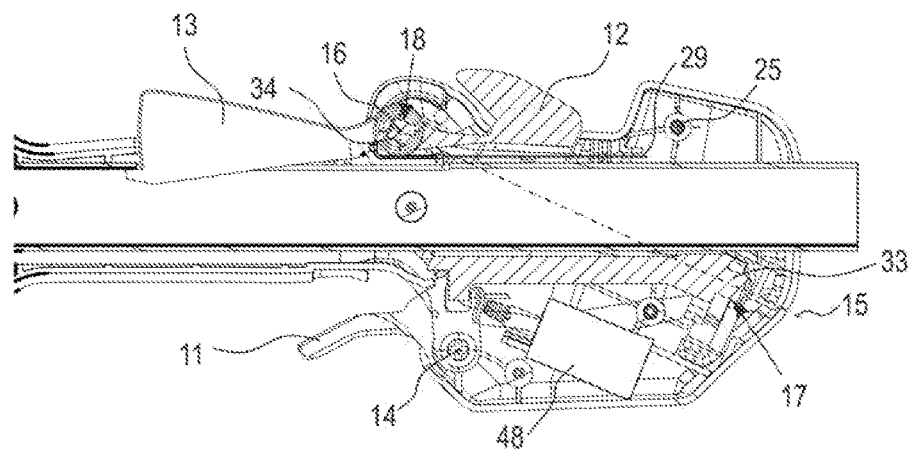
FIG. 21 shows a view in section of a further embodiment of the handle of the hand-guided work apparatus.
Figure 22:
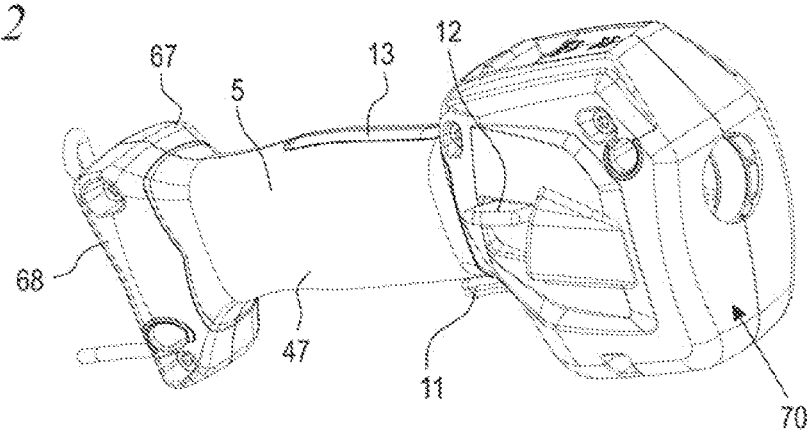
FIG. 22 shows a perspective view of a further embodiment of a handle of a hand-guided work apparatus.

In the alternative embodiment illustrated in FIG. 21, the second pivot bearing 18 of the second operator-controlled element 12 is arranged in the region of the third pivot axis 16 of the third operator-controlled element 13. In the embodiment according to FIG. 21, the third pivot axis 16 extends through the second pivot bearing 18. The holding element 24 is not illustrated in FIG. 21.

Further features in FIGS. 19 to 21 advantageously correspond to those of the preceding embodiment.

FIGS. 22 to 30 show a further embodiment of a handle of a work apparatus. The same reference symbols refer to mutually corresponding elements in all the figures. In order to avoid repetition, for those reference symbols which are given in FIGS. 22 to 30 but are not described below, reference should be made to the description of the corresponding elements in the preceding figures.

Figure 23:
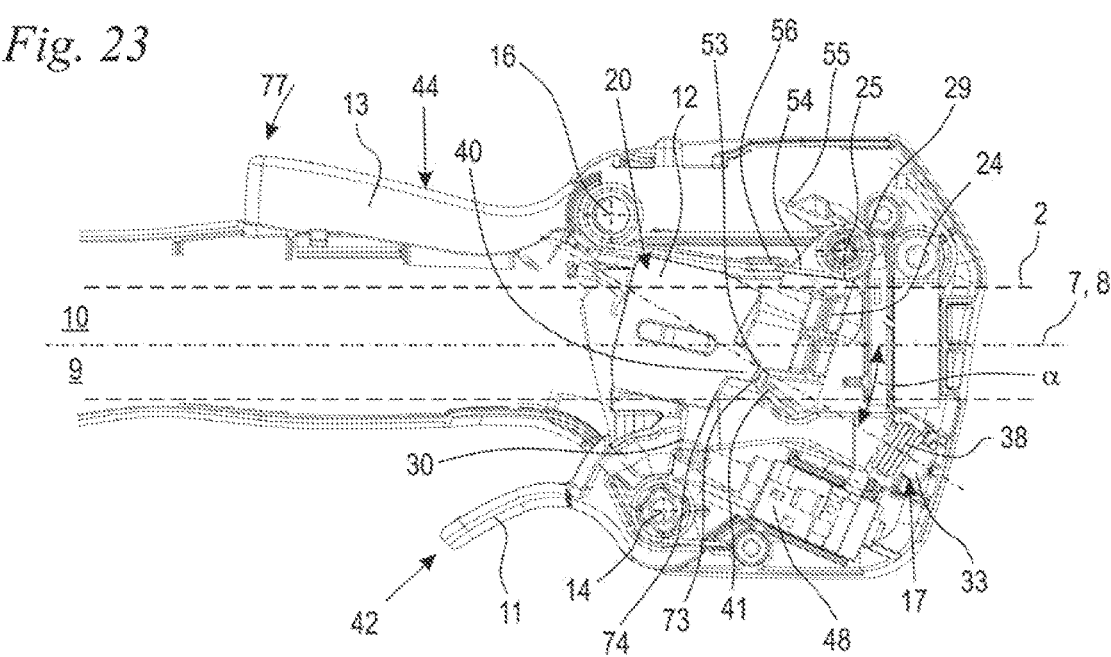
FIG. 23 shows a schematic view in section of the handle from FIG. 22 with unactuated operator-controlled elements.
Figure 24:
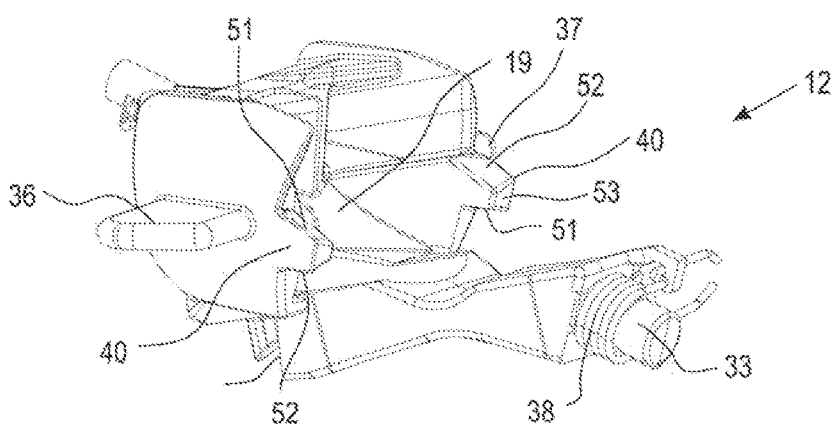
FIG. 24 shows a perspective view of the second operator-controlled element of the handle from FIG. 22.
Figure 25:
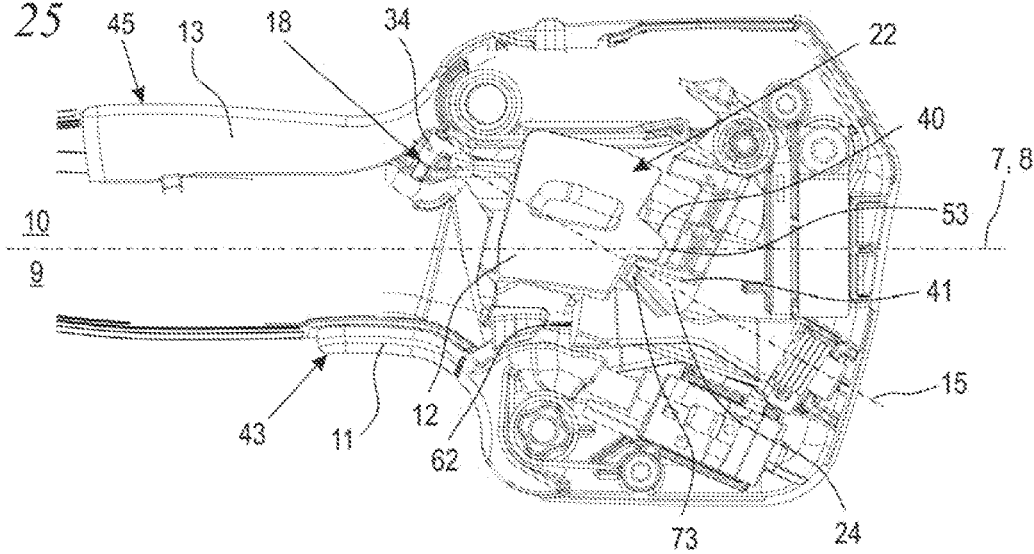
FIG. 25 shows a schematic view in section of the handle from FIG. 22 with actuated operator-controlled elements.

The embodiment illustrated in FIGS. 22 to 30 differs inter alia in the configuration of the holding element 24 and the arrangement and configuration of the projection 40 and the holding section 41 from the preceding embodiments. As shown in FIG. 23, a projection 40 is arranged on an end face 74 of the second operator-controlled element 12. The end face 74 extends around the second pivot axis 15 and is a front face, visible when viewed in the direction of the second pivot axis 15, of the second operator-controlled element 12. As shown in FIG. 24, a further projection 40 is provided on the end face 74 of the second operator-controlled element 12. A configuration with just one projection 40 or three or more projections 40 is also possible.

Illustrated schematically in FIG. 23 is the position of the guide tube 2 which projects through the second operator-controlled element 12 and is surrounded completely by the second operator-controlled element 12 over 360° around the second pivot axis 15.

FIG. 24 shows the configuration of the second operator-controlled element 12 in a perspective view. The second operator-controlled element 12 has two operator-controlled sections 36 and 37 which are arranged opposite each other. As shown in FIG. 24, the second operator-controlled element 12 is formed in the region of the opening 19 approximately annularly about the second pivot axis 15 (FIG. 23). The guide tube 2 projects through the opening 19 (FIG. 23).

Figure 26:
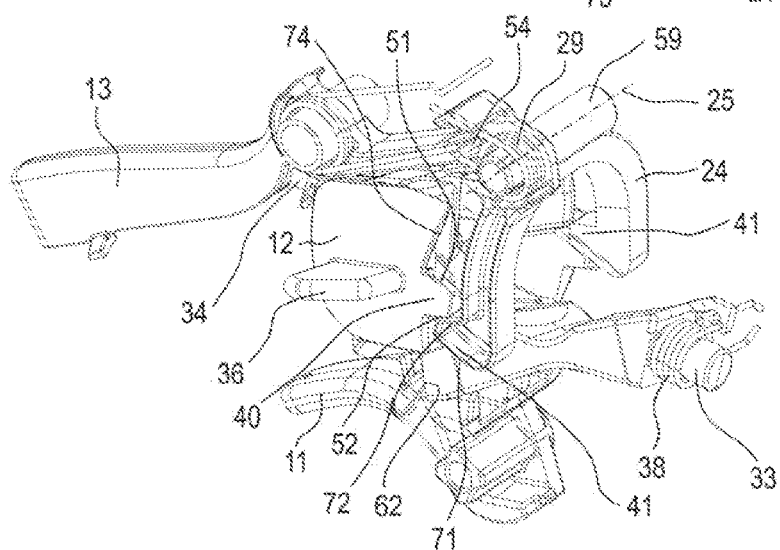
FIGS. 26 to 28 show perspective views of parts of the handle in the position of the operator-controlled elements according to FIG. 25.

As shown in FIG. 26, the holding element 24 has an approximately U-shaped configuration in the embodiment. The holding element 24 is mounted so that it can pivot with the bearing lug 59 about the pivot axis 25. The pivot axis 25 is arranged adjacent to the bottom of the U-shape formed by the holding element 24. The two legs of the U-shape carry the holding sections 41 which project in the direction of an end face 74 of the second operator-controlled element 12 and interact with the projections 40 of the second operator-controlled element 12.

In the unactuated position of the second operator-controlled element 12, as shown in FIG. 23, the end face 73 of the holding section 41 of the holding element 24 lies adjacent to the end face 53 of the projection 40. The holding element 24 is coupled to the third operator-controlled element 13 via the spring 29. The spring 29 has the first end 54 which lies in a receptacle 56 of the third operator-controlled element 13. The second end 55 of the spring 29 contacts the holding element 24. If the third operator-controlled element 13 is actuated, the holding element 24 is pretensioned by the spring 29 against the end face 53 of the second operator-controlled element 12.

In the unactuated position 20 of the second operator-controlled element 12 (FIG. 23), the contact surfaces 51 and 52 on the projection 40 are inclined relative to the second pivot axis 15.

FIGS. 25 to 30 show the second operator-controlled element 12 in its second actuated position 22. In this position, the end face 53 of the projection 40 is pivoted out of the pivoting range of the end face 73 of the holding section 41. The third operator-controlled element 13 is situated in its actuated position 45 in which the holding element 24 is pretensioned against the second operator-controlled element 12. By virtue of the pretensioning, the holding element 24 is pivoted relative to the position illustrated in the preceding figures. The blocking section 62 has moved out of the pivoting range of the first operator-controlled element 11 such that the first operator-controlled element 11 could be shifted into its actuated position 43.

The holding element 24, as shown in FIG. 26, contacts a contact surface 52 of the projection 40 with a contact surface 72 of the holding section 41 in the pivoted position. The contact surface 52 lies in the pivoting path of the projection 40 in the direction of the unactuated position 20 of the second operator-controlled element 12. The holding element 24 consequently holds the second operator-controlled element 12 in the second actuated position 22 as long as the third operator-controlled element 13 is being held in its actuated position 45 by the user. In the embodiment, the holding element 24 engages on the first side 9 of the central plane 8 on the second operator-controlled element 12 and projects into the pivoting path of the latter.

The projection 40 arranged on the opposite side of the second operator-controlled element 12 interacts in the same way with the assigned holding section 41, as shown in FIG. 26.

If the second operator-controlled element 12 is shifted into its first actuated position 21 (not illustrated) (cf FIG. 7), the first contact surface 51 of the projections 40 and the first contact surface 71 of the assigned holding section 41 each interact in order to hold the second operator-controlled element 12 in the first actuated position 21 as long as the third operator-controlled element 13 is situated in its actuated position 45.

Figure 27:
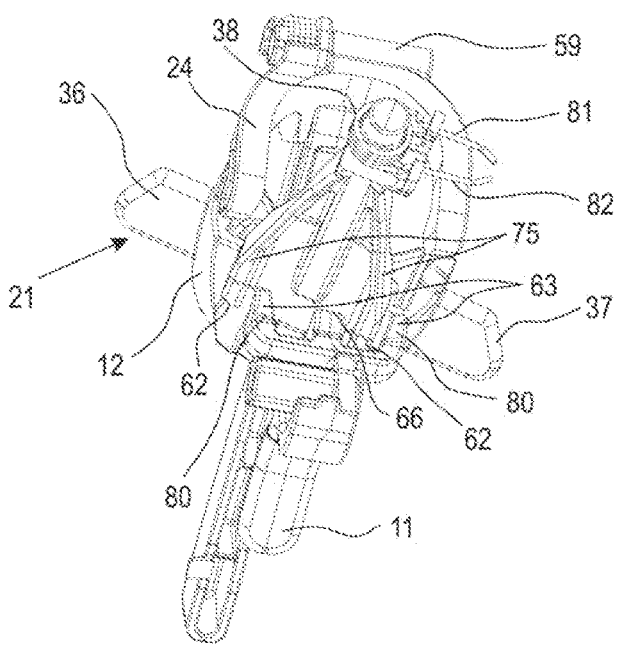

As shown in FIG. 27, the second operator-controlled element has the blocking section 62 which is formed by two ribs 75. The blocking region 63 is correspondingly formed on the first operator-controlled element 11 by two ribs 80 on the first operator-controlled element 11.

A different number and/or arrangement of ribs 75 and 80 or a different configuration of the blocking section 62 and/or the blocking region 63 can also be advantageous.

Figure 28:
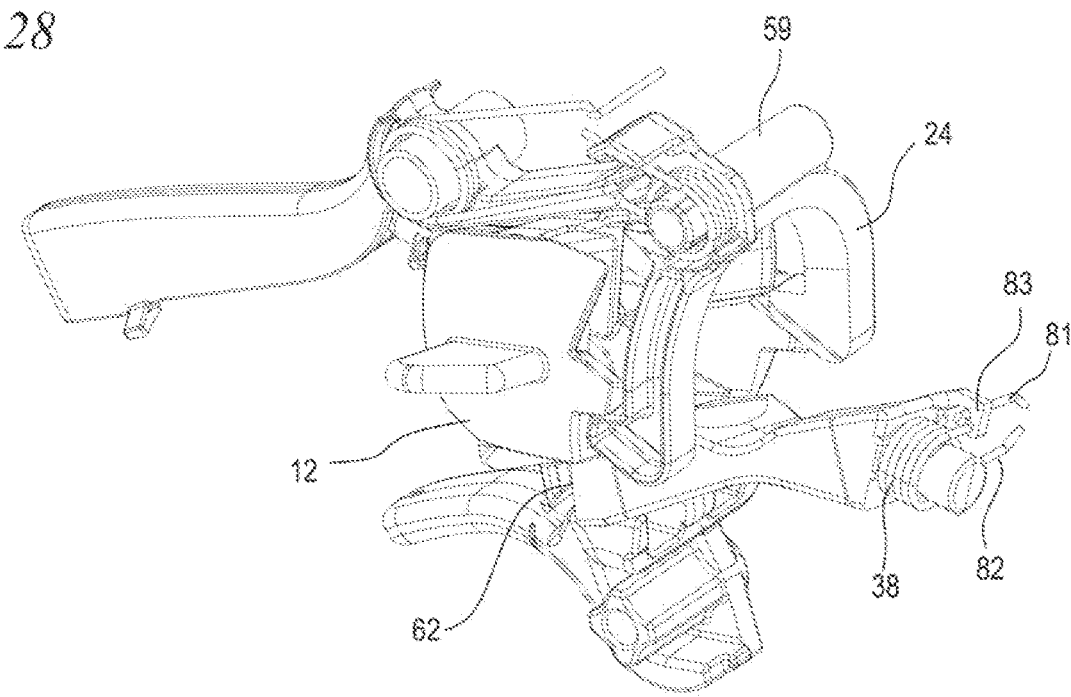

FIG. 28 shows the arrangement of the holding element 24 on the second operator-controlled element 12.

Figure 29:
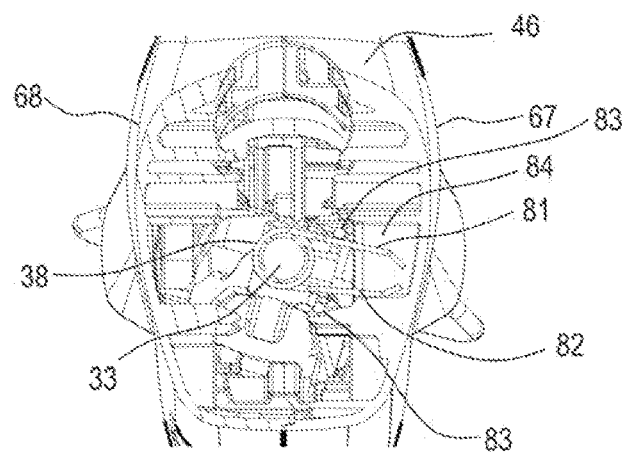
FIG. 29 shows a section through the handle in the region of the first bearing pin of the second operator-controlled element; and, FIG. 30 shows a side view of the second operator-controlled element.
Figure 30:
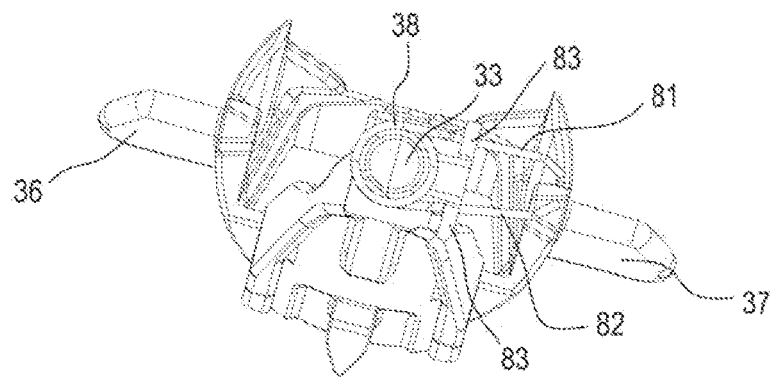

FIGS. 29 and 30 show the arrangement of the spring 38 which pretensions the second operator-controlled element 12 into the unactuated position 20. In the embodiment, the spring 38 is configured as a torsion spring or leg spring. A different configuration of the spring 38 can, however, also be advantageous. The spring 38 has two legs 81 and 82 which are each supported on the second operator-controlled element 12 and on the housing 46. The second operator-controlled element 12 has holders 83 for support on the second operator-controlled element 12.

As shown in FIG. 29, the two legs 81 and 82 are supported on the same housing half-shell 67 of the housing 46. For this purpose, the legs 81 and 82 project into a receptacle 84 formed in the housing half-shell 67. A different configuration of the support can, however, also be advantageous. Because the two legs 81 and 82 are supported on the same component, positional tolerances between the housing 46 and the spring 38 can be minimized.

If the second operator-controlled element 12 is pivoted, one of the legs 81 or 82 contact a holder 83 and the other leg 81 or 82 contact the receptacle 84 of the housing 46.

It is understood that the foregoing description is that of the preferred embodiments of the invention and that various changes and modifications may be made thereto without departing from the spirit and scope of the invention as defined in the appended claims.

What is claimed is:

1. A hand-guided work apparatus comprising:
a guide tube defining a longitudinal center axis;
a tool unit having at least one tool;
said tool unit being arranged on said guide tube;
a drive motor configured to drive said at least one tool;
a handle surrounding said guide tube arranged on said guide tube;
a first operator-controlled element and a second operator-controlled element pivotably mounted on said handle;
said first operator-controlled element being configured to activate said drive motor and being mounted so as to be pivotable about a first pivot axis, wherein said first pivot axis is transverse to said longitudinal center axis;
said second operator-controlled element being mounted so as to be pivotable about a second pivot axis;
said guide tube defining a central plane containing said longitudinal center axis, wherein said central plane is oriented parallel to said first pivot axis;
said first operator-controlled element projecting out of said handle on a first side of said central plane;
a first pivot bearing;
a second pivot bearing;
said second operator-controlled element being mounted pivotably on said first pivot bearing and said second pivot bearing;
said first pivot bearing being arranged on said first side of said central plane;
said second pivot bearing being arranged on a second side of said central plane opposite said first side;
said second operator-controlled element defining an opening through which said guide tube projects; and,
wherein, viewed parallel to said first pivot axis of said first operator-controlled element, said second pivot axis of said second operator-controlled element is inclined relative to said longitudinal center axis of said guide tube by an angle (x) which lies in a range from 5° to 85°.

2. The work apparatus of claim 1, wherein said second operator-controlled element extends over an angle of at least 180° about said longitudinal center axis of said guide tube.

3. The work apparatus of claim 1, wherein said second pivot axis intersects said longitudinal center axis of said guide tube.

4. The work apparatus of claim 1, wherein said second operator-controlled element, in an unactuated position, blocks movement of said first operator-controlled element in a direction of an actuated position of said first operator-controlled element.

5. The work apparatus of claim 4, wherein said second operator-controlled element is pivotable out of said unactuated position in a first pivoting direction into a first release position and in a second opposite pivoting direction into a second release position.

6. The work apparatus of claim 1 further comprising a third operator-controlled element mounted on said handle so as to be pivotable about a third pivot axis.

7. The work apparatus of claim 6, wherein said third operator-controlled element is arranged on said second side of said central plane.

8. The work apparatus of claim 6, wherein said third pivot axis extends parallel to said first pivot axis.

9. The work apparatus of claim 6, wherein said third pivot axis extends through said second pivot bearing.

10. A hand-guided work apparatus comprising:
a guide tube defining a longitudinal center axis;
a tool unit having at least one tool;
said tool unit being arranged on said guide tube;
a drive motor configured to drive said at least one tool;
a handle surrounding said guide tube arranged on said guide tube;
a first operator-controlled element and a second operator-controlled element pivotably mounted on said handle;
said first operator-controlled element being configured to activate said drive motor and being mounted so as to be pivotable about a first pivot axis, wherein said first pivot axis is transverse to said longitudinal center axis;
said second operator-controlled element being mounted so as to be pivotable about a second pivot axis;
said guide tube defining a central plane containing said longitudinal center axis, wherein said central plane is oriented parallel to said first pivot axis;
said first operator-controlled element projecting out of said handle on a first side of said central plane;
a first pivot bearing;
a second pivot bearing;
said second operator-controlled element being mounted pivotably on said first pivot bearing and said second pivot bearing;
said first pivot bearing being arranged on said first side of said central plane;
said second pivot bearing being arranged on a second side of said central plane opposite said first side;
said second operator-controlled element defining an opening through which said guide tube projects;
a third operator-controlled element mounted on said handle so as to be pivotable about a third pivot axis and,
a holder configured to hold said second operator-controlled element in a release position as long as said third operator-controlled element is in an actuated position.

11. The work apparatus of claim 10 further comprising a holding element; said third operator-controlled element being configured to act on said holding element; and, said holding element is configured to hold said second operator-controlled element in said release position as long as said third operator-controlled element is in said actuated position.

12. The work apparatus of claim 11, wherein said third operator-controlled element is configured to act on said holding element via a spring.

13. The work apparatus of claim 11, wherein said holding element is mounted so as to be pivotable about a fourth pivot axis extending parallel to said third pivot axis.

14. A hand-guided work apparatus comprising:
a drive motor;
at least one tool configured to be driven by said drive motor;
at least one handle;
a first operator-controlled element, a second operator-controlled element, and a third operator-controlled element pivotably mounted on said handle;
said first operator-controlled element being configured to activate said drive motor and being mounted so as to be pivotable about a first pivot axis;
said second operator-controlled element being mounted so as to be pivotable about a second pivot axis;
a blocking unit configured to release said first operator-controlled element in a release position of said blocking unit in order to operate said drive motor and to block said first operator-controlled element in a blocking position of said blocking unit in order to block said drive motor;
said blocking unit being configured to be shifted via said second operator-controlled element between said release position and said blocking position;
said third operator-controlled element is mounted so as to be pivotable about a third pivot axis;
a holding element;
said third operator-controlled element being configured, in a first actuated position, to hold said second operator-controlled element in a second actuated position via said holding element;
said holding element being mounted so as to be pivotable about a fourth pivot axis; and,
said second pivot axis lying in a plane extending perpendicular to said fourth pivot axis.

15. The work apparatus of claim 14, wherein, in an unactuated position, said second operator-controlled element blocks movement of said first operator-controlled element in a direction of a third actuated position of said first operator-controlled element; and, said second operator-controlled element is configured to be pivoted out of said unactuated position in a first pivoting direction into a first release position and in a second opposite pivoting direction into a second release position.

16. The work apparatus of claim 14, wherein said third pivot axis extends parallel to said first pivot axis.

17. The work apparatus of claim 14, wherein said third operator-controlled element is configured to act on said holding element via a spring.

18. The work apparatus of claim 14, wherein said fourth pivot axis extends parallel to said third pivot axis.

* * * * *

UNITED STATES PATENT AND TRADEMARK OFFICE
CERTIFICATE OF CORRECTION

| | | |
|---|---|---|
| PATENT NO. | : 12,064,860 B2 | Page 1 of 1 |
| APPLICATION NO. | : 17/687269 | |
| DATED | : August 20, 2024 | |
| INVENTOR(S) | : Roland Mandel et al. | |

It is certified that error appears in the above-identified patent and that said Letters Patent is hereby corrected as shown below:

In the Specification

In Column 11:
Line 62: insert -- β -- after "angle".

In the Claims

In Column 15:
Line 60: delete "angle (x)" and insert -- angle (α) -- therefor.

Signed and Sealed this
Twenty-fourth Day of December, 2024

Derrick Brent
*Acting Director of the United States Patent and Trademark Office*